United States Patent [19]

Kelly et al.

[11] 3,969,174

[45] July 13, 1976

[54] PLASTIC LAMINATE

[75] Inventors: Peter B. Kelly, Coshocton; Donald G. Pucci, West Lafayette, both of Ohio

[73] Assignee: General Electric Company, Schenectady, N.Y.

[22] Filed: Dec. 20, 1974

[21] Appl. No.: 535,071

[52] U.S. Cl. ............................. 156/219; 156/289; 428/530
[51] Int. Cl.² ........................................... B44C 1/24
[58] Field of Search .......... 156/242, 288, 289, 306, 156/309, 313, 580, 583, 219–222; 428/530, 531, 535; 100/211, 295, 296

[56] References Cited
UNITED STATES PATENTS

| | | | |
|---|---|---|---|
| 2,442,422 | 6/1948 | Loetscher | 156/288 |
| 3,215,579 | 11/1965 | Hagen | 156/289 |
| 3,236,714 | 2/1966 | Traut | 156/323 |
| 3,303,081 | 2/1967 | Michaelson et al. | 156/219 |
| 3,373,068 | 3/1968 | Grosheim et al. | 156/219 |
| 3,698,978 | 10/1972 | McQuade | 156/220 |
| 3,723,220 | 3/1973 | Scher et al. | 156/289 |
| 3,761,338 | 9/1973 | Ungar et al. | 156/220 |

*Primary Examiner*—Douglas J. Drummond
*Assistant Examiner*—John E. Kittle

[57] ABSTRACT

The surface smoothness of decorative laminate pressed without pans is improved by using as a pressure equalizing medium during consolidation of the laminate lay-up under heat and pressure, a thermoplastic resin layer between successive laminate lay-ups which melts or softens and flows at the consolidation temperature, the thermoplastic resin layer being protected on either side by a release medium. The use of the thermoplastic resin layer eliminates the use of the usual highly polished metal caul plates for all but the smoothest laminates and permits the use of press build-ups of many more laminate lay-ups than when using metal caul plates.

7 Claims, No Drawings

PLASTIC LAMINATE

This invention relates to the production of decorative laminates having improved surface smoothness. More particularly, it relates to the production of such improved decorative laminates wherein thermoplastic resin layers which melt or soften and flow at the laminate consolidation temperatures are utilized in lieu of the usual caul plates.

Generally, in the production of decorative laminates, highly polished caul plates as of stainless steel or other corrosion-resistant metal are used to equalize the pressure over the extent of the laminant lay-up to insure good consolidation as well as to impart to the surface of the laminate a smoothness which is desirable in many applications. As the use of decorative laminates has increased, there has come a demand for laminates having smoothness less than that afforded by the highly polished pans but greater than that obtainable by simply omitting the pans. Such smoothness is primarily esthetic which is better judged by the eye than by precise mechanical testing.

Accordingly, it is a primary object of the present invention to provide a process for producing decorative laminates which are characterized by increased surface smoothness without the costly use of pans as well as the process for making such laminates.

Briefly, then, in accordance with the present invention, there is provided a process for producing smooth surfaced laminates and the product thereof in which the individual laminate lay-ups are separated by a layer of thermoplastic resin which melts or softens and flows at the laminate consolidation temperatures, such resin layer being protected on either side by a thin, impermeable layer as of greaseproof paper, glassine paper, aluminum foil, regenerated cellulose film, releasable non-melting resin films such as polypropylene film, polyvinyl fluoride (Tedlar), and the like. The use of the thermoplastic layer eliminates the need for the usual caul plates and permits the pressing at one and the same time of many more laminate lay-ups than is possible or practical using caul plates. The smoothness of the laminate surface can be even further improved where desired by using as the print sheet for the decorative laminate a compressible paper such as pigmented alpha cellulose decor or decorative paper which is not resin impregnated in the usual way, the resin impregnation of such layer taking place during laminate consolidation by flow of resin from the adjacent layers, the protective overlay above and the topmost core sheet below.

Plastic laminates prepared from superimposed layers of paper pre-impregnated with thermosetting resins and consolidated under heat and pressure are well known. Generally speaking, such laminates consist of a number of resin impregnated core layers which have superimposed thereon a print paper for decorative purposes. In many cases the decorative or print layer is overlaid with a protective layer, again usually resin impregnated, which is relatively transparent so that the print or design can be seen through the protective layer. Typically, the core layers are of ordinary or creped kraft paper which can be impregnated with any of a number of thermosetting resins. Preferred and most generally used for impregnation of the core layers is a condensation product of a phenol and an aldehyde, more particularly an alkali catalyzed phenol formaldehyde condensation product typified by Resinox resins manufactured by the Monsanto Company. Generally, the resin content of the core paper ranges from about 20–35 percent by weight for ordinary kraft paper, and from about 20–40 percent by weight of resin for a normally used creped kraft paper. The print paper is usually impregnated with a thermosetting resin characterized by resistance to discoloring and wear. While any of a number of resins can also be used for this purpose, modified melamine formaldehyde products are particularly useful. Exemplary of such a melamine formaldehyde resin are Cymel resins manufactured by American Cyanamid. This resin is a white, free-flowing powder, specifically designed for the purpose, and is readily soluble in water or in alcohol-water solvents, giving a clear, colorless solution which is stable for several days at 50 percent solids content. In some cases, as pointed out above, the print sheet or layer can be used in an unimpregnated state, in which case it becomes resin impregnated during the final laminate consolidation by resin bleeding from the protective transparent or translucent overlay sheet above and the topmost core sheet below.

When an overlay sheet or protective layer is used in addition to the print sheet, it is generally of a high purity, highly translucent, alpha cellulose paper, rayon paper, and the like which is treated with essentially the same resin as the print paper to a resin content of about 60 to 65 percent by weight. The resin impregnated core sheets, as well as the print sheet and overlay paper, if any, are dried without substantially advancing the cure of their impregnating resin where used, and laid up in the desired number with one overlay paper and one print sheet layer to a number of core layers, the whole being cured as by placing between polished steel panels or caul plates at times varying from about 15 to 30 minutes, at from 125° to 150°C, at pressures ranging from about 1000 psi to 1500 psi, the laminates then preferably being cooled, still under pressure, to below about 40°C and removed from the press. In some cases, in place of the overlay paper, a resin suspension containing abrasion resistance materials can be used, or such abrasion resistant materials can be included in the overlay impregnating resin. Generally speaking, using metal caul plates, from about 12 to 18 laminate lay-ups can be pressed in one opening of the press using, of course, release papers between each laminate lay-up and between the lay-up assembly and the caul plates.

It has been unexpectedly found that when a thermoplastic resin layer, which melts or softens and flows at the laminate consolidation temperature and which is suitably protected on either side by a protective layer, is placed between each laminate lay-up, laminates of decidedly superior surface smoothness are produced. Not only is the surface smoothness improved over conventional no-pan laminates but such improvement is maintained when twice or more the number of laminate lay-ups are used for each press opening as compared to pressing when using highly polished stainless steel caul plates. Thus, the present invention provides not only reasonably smooth surfaced laminates but simplifies the assembly and pressing or consolidation of such laminates by eliminating the use of the usual caul plates which are expensive to produce and to resurface, as they must be periodically in order to provide even a relatively rough surfaced product with their use because repeated handling invariably results in nicks and dents which transfer to the laminate surface as undesirable non-uniformities.

Any thermoplastic resin material which melts or softens at the laminate consolidation temperatures can be used in connection with the present invention. These include polyethylene and ethylene-acrylic copolymer film manufactured by Dow as 4333.09 which is believed to be essentially a copolymer of ethylene and acrylic acid. Also useful is a Dow EPZ material which is essentially a coextruded material consisting of a layer of polyethylene and a layer of the Dow 4333.09 material.

Also useful in the above role are various ethylene vinyl chloride materials. Typical of such products are Monflex 4800 produced by Monsanto, this material being a water emulsion of ethylene vinyl chloride having carboxyl pendant groups, a molecular weight of about 40,000 to 50,000, a viscosity of 50 to 150 cp as measured on the Brookfield Rheometer and a glass transition temperature of 0°C. Another ethylene vinyl chloride latex material is typified by Monflex 4530 also produced by Monsanto, this ethylene vinyl chloride having amide pendant groups, a molecular weight of 80,000 to 90,000, a Brookfield viscosity of 25 to 200 cp and a glass transition temperature of 30°C.

Also useful is Monflex 4514, an ethylene vinyl chloride latex with amide pendant groups having a molecular weight of 60,000 to 70,000, a Brookfield viscosity of 200 to 500 cp and a glass transition temperature of 14°C. Another useful material is Monflex 4500 which is similar to Monflex 4514 except that it has a molecular weight of 40,000 to 50,000, a Brookfield viscosity of 50 to 150 cp and a glass transition temperature of 0°C. Monflex 4815, also useful in the present application, is similar to Monflex 4800 except that it has a molecular weight of 60,000 to 70,000, a Brookfield viscosity of 200 to 500 cp and a glass transition temperature of 140°C. Also useful are copolymers of methylmethacrylate and ethyl acrylate such as Rohm and Haas Rhoplex material HA-12 or HA-16.

Still another useful softenable thermoplastic film material is Surlyn ionomer resin manufactured by DuPont which is believed to be a combination of polyethylene and acrylic acid cross-linked with zinc.

In general, then, any material having the above specified characteristics is useful. While it is often convenient to use as the resin layer a separate discrete film, it will be realized that particularly using emulsions such as those above, the layer can in effect be coated on either one or both of the surrounding release papers. Such release papers are, of course, well known to those skilled in the art. Among such materials are the so-called glassine papers which are thin, dense, transparent or semi-transparent paper which is highly resistant to the passage of air and grease. One such paper is made of a highly pulped material coated with material such as stearic acid, silicones and the like. Another release is Avisco, a regenerated cellulose material. Also useful is whalehide, a parchmentized, high wet strength kraft paper.

Among the thermoplastic resin materials which have melting or softening temperatures outside the present consolidation temperature range are polypropylene, Tedlar — a polyvinyl fluoride material, and Mylar polyester. Of course, with great elevation of the consolidation laminating temperature, these as well as many other materials could be used so long as they fit specified parameters, but such high temperatures would normally be impractical. It has also been found that rubber layers, although compressible, are not useful in the present connection if they do not melt or soften and flow.

The following examples will illustrate the practice of the present invention, it being realized that they are not to be taken as limiting or restrictive in any way.

In one case the laminate lay-up consisted of two kraft paper sheets impregnated with phenol formaldehyde resin superimposed upon which was a sheet of compressible, raw, untreated kraft paper which was in turn surmounted by a solid color decor sheet treated as above with melamine formaldehyde resin. Another laminate lay-up consisted of two core sheets of phenolic treated kraft paper as above, a superimposed, compressible, raw or untreated print sheet which was in turn surmounted by an overlay sheet as described above and impregnated with melamine formaldehyde resin.

EXAMPLE 1

Using the above laminate lay-ups there was prepared a press load of fourteen openings of the laminates using pack buildups of thirty-six laminate lay-ups per opening without pans, there being inserted between each laminate lay-up face or upper surface a sheet of 1.5 mil polyethylene protected on either side by glassine release paper, such polyethylene-glassine combination also being used at the top and bottom of each opening. The lay-ups described above were treated or cured and consolidated at a temperature of 130°C at a pressure of 1200 psi for 20 minutes, after which the temperature was reduced to about 35°C and the consolidated lay-ups or laminates removed and separated. It was found that the surface smoothness of the laminates so prepared was decidedly superior to equivalent laminates using no polyethylene film between the release sheets. It was further found that the laminates were well consolidated and, as shown in the table below, of good quality according to standard tests. It was also found that the laminates were suitable for postforming and reasonably resistant to blistering at the temperatures normal to the postforming operation.

EXAMPLE 2

Example 1 was repeated except that in lieu of the polyethylene, the thermoplastic layer was Dow 4333.09 ethylene-acrylic copolymer film.

EXAMPLE 3

Example 1 was repeated using in lieu of the polyethylene film Dow EPZ material which is a coextruded layer of polyethylene and a layer of the Dow 4333.09 material. Again, the surface smoothness results were superior to equivalent laminates made with no thermoplastic film as taught herein.

EXAMPLE 4

Example 1 was repeated except that in lieu of the polyethylene film, Surlyn ionomer film made by DuPont was used, once again resulting in laminates with superior surface esthetics.

EXAMPLE 5

Example 1 was repeated except that in lieu of the polyethylene layer, one of the glassine release sheets was coated with one to three mils of an ethylene vinyl chloride emulsion, specifically Monflex 4500. It was found that the coating was a suitable replacement for the polyethylene thermoplastic film.

EXAMPLE 6

Example 1 was repeated, using in lieu of the glassine release sheet aluminum foil laminated to lithographic paper wherein the foil side of the sandwich was coated with silicone release, the results being comparable.

EXAMPLE 7

Examples 1 through 6 were repeated using three and four core sheets in lieu of two. While the surface smoothness was slightly inferior to that attained when only two core sheets were used, such smoothness was still of superior quality compared to equivalent laminates made with no thermoplastic film.

EXAMPLE 8

Examples 1 through 6 were repeated except that instead of pressing the laminates in packs or books of 36 lay-ups, books or packs of only six lay-ups were used. All surface appearances were equivalent to those where the lay-ups were pressed in packs of 36.

Shown in the following Table I are the results obtained when the materials of Example 1 were tested by standard NEMA tests.

TABLE I

| Property | NEMA TEST DATA | | | | |
|---|---|---|---|---|---|
| | TX9542* | TX1612* | TX1612* | TX1480* | TX1480* |
| Laminate Thickness | .023 | .022 | .023 | .027 | .028 |
| Cigarette Resistance | 57 | 40 | 42 | 68 | 67 |
| Wear Resistance | 400 | 300 | 300 | 900 | 850 |
| Wear Rate | .056 | .082 | .072 | .069 | .059 |
| Film Thickness | .0025 | .0022 | .0026 | .0053 | .0054 |
| Dimensional Change | | | | | |
| Length | .17% | .17% | .16% | .17% | .18% |
| Cross | .34% | .32% | .32% | .29% | .31% |
| Boil Delamination | OK | OK | OK | OK | OK |
| Water Absorption | | | | | |
| Weight | 13.59 | 12.64 | 14.01 | 11.87 | 13.36 |
| Thickness | 14.61 | 13.42 | 13.98 | 13.77 | 16.36 |
| Impact | 20" | 21" | 22" | 22" | 23" |
| 60° Gloss Length | 4 | 5 | 6 | 8 | 7 |
| Cross | 3 | 5 | 5 | 7 | 7 |
| Boiling Water Resistance | OK | OK | OK | OK | OK |
| High Temperature Resistance | OK | OK | OK | OK | OK |
| Color Fastness | 1-L | 1-L | 1-L | 1-D | 1-D |
| Stains No. 2 (Superficial) | 9-18-20-24-27 | 4-9-16-18-20-24-27-29 | 4-18-20-24-29 | 18-20-24-28 | 18-20-24 |
| Stains No. 3 | | | 27 | 27 | 27 |

*TX numbers refer to decorative patterns, TX9542 being simulated walnut, TX1612 poppy, and TX1480 white.

There is provided, then, by the present invention a process for making decorative laminates which are characterized by surface smoothness much greater than heretofore obtained in packs wherein no pans are used. Not only are the laminates produced of high quality but the process for producing them is relatively inexpensive and simple and eliminates the necessity for the commonly used stainless steel press pans.

What we claim as new and desire to secure by Letters Patent of the United States is:

1. The process of improving the surface smoothness of decorative plastic laminates prepared by the heat and pressure consolidation without caul plates of at least one lay-up consisting consecutively from bottom to top surface of a plurality of thermosetting resin impregnated paper core sheets, a thermosetting resin impregnated print sheet and a thermosetting resin impregnated overlay sheet which improvement consists of placing at the surface of each laminate lay-up to be consolidated a sandwich consisting of a thermoplastic layer which melts or softens and flows at the consolidation temperature, and a release layer on either side of said thermoplastic layer.

2. The process of claim 1 wherein said thermoplastic layer melts or softens below or at the normal decorative laminate press temperature range of 100°C to 150°C.

3. The process of claim 1 wherein said thermoplastic layer is selected from polyethylene and polyethyleneacrylic copolymer and ethylene vinyl chloride.

4. The process of claim 1 in which said overlay sheet is omitted.

5. The process of claim 1 wherein said surface smoothness is further improved by using raw print sheet.

6. The process of claim 1 wherein said surface smoothness is further improved by incorporating a sheet of unimpregnated raw core paper beneath the print sheet.

7. The process of claim 1 wherein said thermoplastic layer is a coating on a release layer.

* * * * *